(12) United States Patent
Krittian et al.

(10) Patent No.: US 9,714,667 B2
(45) Date of Patent: Jul. 25, 2017

(54) HYDROSTATIC HYBRID DRIVE DEVICE FOR A HYBRID DRIVE TRAIN

(71) Applicant: Linde Hydraulics GmbH & Co. KG, Aschaffenburg (DE)

(72) Inventors: Lukas Krittian, Aschaffenburg (DE); Alfred Langen, Grossostheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 48 days.

(21) Appl. No.: 14/557,477

(22) Filed: Dec. 2, 2014

(65) Prior Publication Data

US 2015/0204355 A1 Jul. 23, 2015

(30) Foreign Application Priority Data

Dec. 13, 2013 (DE) .................. 10 2013 114 035
May 20, 2014 (DE) .................. 10 2014 107 118

(51) Int. Cl.

| | |
|---|---|
| *B60K 6/12* | (2006.01) |
| *F15B 1/04* | (2006.01) |
| *B60K 6/48* | (2007.10) |
| *F02N 5/00* | (2006.01) |
| *F02N 9/04* | (2006.01) |
| *F15B 1/02* | (2006.01) |
| *F15B 1/027* | (2006.01) |

(52) U.S. Cl.
CPC .................. *F15B 1/04* (2013.01); *B60K 6/12* (2013.01); *B60K 6/48* (2013.01); *F02N 5/00* (2013.01); *F02N 9/04* (2013.01); *F15B 1/024* (2013.01); *F15B 1/027* (2013.01); *F15B 2201/411* (2013.01); *Y02T 10/6208* (2013.01); *Y02T 10/6221* (2013.01); *Y02T 10/6282* (2013.01); *Y10S 903/915* (2013.01)

(58) Field of Classification Search
None
See application file for complete search history.

(56) References Cited

U.S. PATENT DOCUMENTS

| | | | |
|---|---|---|---|
| 7,725,222 B2 * | 5/2010 | Endo ...................... | B60K 6/445 180/65.21 |
| 8,079,436 B2 | 12/2011 | Tikkanen et al. | |
| 2009/0008174 A1 * | 1/2009 | Tikkanen ................. | B60K 6/12 180/165 |
| 2009/0032317 A1 * | 2/2009 | Epshteyn ................. | B60K 6/12 180/305 |

(Continued)

FOREIGN PATENT DOCUMENTS

WO 2007071362 A1 6/2007

*Primary Examiner* — John Walters
*Assistant Examiner* — Hilary L Johns
(74) *Attorney, Agent, or Firm* — The Webb Law Firm

(57) ABSTRACT

A hydrostatic hybrid drive device (H) includes only one hydrostatic displacement machine (1) operated in an open circuit. A delivery line (2) leads to a high pressure accumulator device (3). A shutoff valve (5) controls flow to the high pressure accumulator device (3). A branch line (6) is connected with a low pressure accumulator device (7). A shutoff valve (9) in the intake line (8) shuts off flow to the low pressure accumulator device (7). A discharge line (10) is connected between the intake side (S) of the displacement machine (1) and the shutoff valve (9). A valve device (15) controls the discharge line (10) and the branch line (6).

32 Claims, 7 Drawing Sheets

(56) References Cited

U.S. PATENT DOCUMENTS

| | | | |
|---|---|---|---|
| 2010/0236232 A1* | 9/2010 | Boehm | E02F 9/123 60/413 |
| 2012/0077632 A1* | 3/2012 | Babbitt | B60K 6/12 475/1 |
| 2013/0118617 A1* | 5/2013 | Long | B60K 6/48 137/565.29 |
| 2015/0128597 A1* | 5/2015 | Schlak | F03B 13/00 60/719 |
| 2015/0204355 A1* | 7/2015 | Krittian | B60K 6/12 60/596 |

* cited by examiner

HYDROSTATIC HYBRID DRIVE DEVICE FOR A HYBRID DRIVE TRAIN

CROSS REFERENCE TO RELATED APPLICATIONS

This application claims priority to German Application Nos. DE 102013114035.1 filed Dec. 13, 2013 and 102014107118.2 filed May 20, 2014, which are herein incorporated by reference in their entireties.

BACKGROUND OF THE INVENTION

Field of the Invention

This invention relates to a hydrostatic hybrid drive device for a hybrid drive train of a vehicle with a drive motor and a consumer driven by the drive motor.

Description of Related Art

Vehicles, for example motor vehicles or public transit vehicles, for example buses, preferably for urban mass transit, as well as mobile self-propelled machines, in particular industrial trucks, agricultural machines, forestry machines and construction machines such as excavators, wheel and telescoping loaders, tractors, combine harvesters, forage harvesters, sugar beet and potato harvesters, for example, have a drive train with a drive motor which is generally in the form of an internal combustion engine and which drives a consumer, which can be, for example, a traction drive of the vehicle.

Hybrid drive train concepts are being employed with increasing frequency on such vehicles. With regard to the construction of the hybrid drive train, known models include serial hybrid, parallel hybrid, or power-split hybrid drives.

Vehicles with a hybrid drive train are driven by a combination of different energy sources. In addition to the drive motor, which is generally in the form of an internal combustion engine, another energy source of the hybrid drive device is provided and carried onboard the vehicle. On a mechanical hybrid drive device, the other energy source can be formed, for example, by a flywheel; on an electrical hybrid drive device the other energy source can be formed by a battery, storage battery, or high-power capacitors; or on a hydrostatic hybrid drive device the other energy source can be formed by a hydrostatic accumulator.

Known hybrid drive devices have a high degree of system complexity and therefore entail a high level of capital investment, design, and production costs.

Known electric hybrid drive devices consist of an electrical energy storage device and an electrical machine that can be operated as a motor and a generator, which is generally in the form of an asynchronous machine and the actuation of which requires power electronics. For the electrical energy storage device or system, an automatic climate control system is also generally necessary to be able to heat and cool the electrical energy storage device or system in operation. Electrical hybrid drive devices are very cost-intensive on account of the low capacity of the electrical energy storage device or system and the additional components that are required for their operation from the fields of power electronics and climate control technology. In addition, the low power density and low energy density of the electrical energy storage device or system has a negative effect on the total weight of the, vehicle. A further disadvantage of electrical hybrid drive devices is that the electrical energy storage device or system represents an increased hazard potential, for example by self-ignition, as well as a danger to a person extinguishing a burning vehicle that has an onboard electrical energy storage device or system.

Known mechanical hybrid drive devices with a mechanical energy accumulator, such as a flywheel accumulator, generally work with very large or very fast rotating flywheels. However, the additional mass of the flywheel accumulator of a mechanical hybrid drive device results in a reduction of the energy consumption advantage of the vehicle because more energy is required for the acceleration of the vehicle in the traction cycles.

Known hydrostatic hybrid drive devices frequently require a large number of valves to temporarily store power in a hydrostatic accumulator and discharge it again. WO 2007/071362 A1 describes a generic hydrostatic hybrid drive device for a vehicle in which the hydrostatic hybrid drive device is in the form of a displacement machine which is connected on one side by means of a line with the tank and on the second side by means of an additional line with a hydrostatic accumulator. The displacement machine can be operated as a pump and as a motor and is provided for the delivery of hydraulic fluid in both directions of flow. The displacement machine is in the form of a controllable drive unit with a variable displacement volume. In WO 2007/071362 A1, different directions of flow of the displacement machine result during pump operation and motor operation. To make possible pump and motor operation in the same direction of rotation of the hydrostatic displacement machine, it must be possible to vary the drive unit in both directions and, therefore, it must be controllable in both directions from the position where the displacement volume is zero, as a result of which the control device of the hydrostatic displacement machine and thus the hydrostatic displacement machine of the hydrostatic hybrid drive device is correspondingly complex and expensive.

SUMMARY OF THE INVENTION

Therefore it is an object of this invention to provide a hydrostatic hybrid drive device that has a simple, compact, and economical construction.

This object is accomplished in that the hybrid drive device comprises only one hydrostatic displacement machine, which is operated in an open circuit and can be operated as a pump and motor in the same direction of rotation and the same direction of flow of a hydraulic fluid. A delivery line is connected to an outlet-side delivery side of the hydrostatic displacement machine and leads to a high pressure accumulator device. When it is operated as a pump, the hydrostatic displacement machine delivers exclusively into the high pressure accumulator device which forms the only consumer supplied by the hydrostatic displacement machine. A shutoff valve is located in the delivery line and opens toward the high pressure accumulator device. Branching off from the delivery line between the delivery side of the hydrostatic displacement machine and the shutoff valve, there is a branch line that is connected with a low pressure accumulator device. An intake line (suction line) in communication with the low pressure accumulator device is connected to an inlet-side intake side of the hydrostatic displacement machine. In the intake line there is a shutoff valve that shuts off the flow to the low pressure accumulator device. A discharge line from the high pressure accumulator device is connected to the intake line between the intake side of the hydrostatic displacement machine and the shutoff valve. A valve device is provided that actuates the discharge line and the branch line. The valve device, when the hydrostatic displacement machine is operated as a pump, shuts off the discharge line and the branch line and, when the hydrostatic displacement machine is operated as a motor, actuates the discharge line and the branch line into the open position.

The hydrostatic hybrid drive device of the invention includes a hydrostatic displacement machine operated in an open circuit which can be operated as a pump and a motor in the same direction of rotation and the same direction of flow of the hydraulic fluid. The hydrostatic displacement machine is in communication on an outlet-side delivery side with a delivery line which leads to the high pressure accumulator device. The high pressure accumulator device represents the sole consumer of the hydrostatic displacement machine, so that on the hybrid drive device of the invention, the hydrostatic displacement machine delivers exclusively into the high pressure accumulator device. In the delivery line is a shutoff valve that opens toward the high pressure accumulator device and prevents the return flow from the high pressure accumulator device to the delivery side of the hydrostatic displacement machine. With a shutoff valve of this type, the high pressure accumulator device can be charged in a manner which is simple from a technical point of view and when the high pressure accumulator device is charged, a discharge of the hydraulic fluid from the high pressure accumulator device to the delivery side of the hydrostatic displacement machine can be prevented. Connected to an inlet-side intake side of the hydrostatic displacement machine is an intake line that is in communication with the low-pressure accumulator device. A shutoff valve is located in the intake line and shuts off the flow to the low pressure accumulator device. A discharge line of the high pressure accumulator device is connected to the intake line between the intake side of the hydrostatic displacement machine and the shutoff valve. When the hydrostatic displacement machine is operated as a motor, the hydrostatic displacement machine is fed hydraulic fluid under pressure on the intake side from the high pressure accumulator device. When the hydrostatic displacement machine is operated as a motor, the shutoff valve located in the intake line makes it possible in a simple manner to prevent a discharge of the hydraulic fluid from the high pressure accumulator device into the low pressure accumulator device. A hydrostatic displacement machine of this type has a simple and economical construction. A branch line, which is connected with the low pressure accumulator device, branches off from the delivery line between the delivery side of the hydrostatic displacement machine and the shutoff valve located in the delivery line. With a branch line of this type, it becomes possible in a simple manner from a switching point of view to drive the hydrostatic displacement machine in motor operation, whereby the hydrostatic displacement machine is driven on the intake side with the hydraulic fluid from the high pressure accumulator device, and to connect the delivery side of the hydrostatic displacement machine by means of the branch line with the low pressure accumulator device, so that a return of the hydraulic fluid driving the hydrostatic displacement machine from the high pressure accumulator device to the low pressure accumulator device becomes possible.

To control the operation of the hydrostatic displacement machine as a pump and as a motor, a valve device is provided which actuates the discharge line and the branch line, When the hydrostatic displacement machine is operated as a pump, the valve device shuts off the discharge line and the branch line, and when the hydrostatic displacement machine is operated as a motor opens the discharge line and the branch line to allow the flow of hydraulic fluid. With the valve device that actuates the branch line and the discharge line, it thereby becomes possible in a simple manner for the hydrostatic displacement machine, when operated as a pump, wherein the discharge line and the branch line are shut off by means of the valve device, to intake hydraulic fluid with the intake side from the low pressure accumulator device, and to deliver via the delivery side into the high pressure accumulator device, and for the hydrostatic displacement machine, when operated as a motor, wherein the discharge line and the branch line are opened by means of the valve device, to be driven on the intake side by the hydraulic fluid under pressure from the high pressure accumulator device and to deliver on the delivery side by means of the open branch line to the low pressure accumulator device. Because in the hybrid drive device of the invention the high pressure accumulator device is the only consumer of the hydrostatic displacement machine, a compact construction of the hybrid drive device becomes possible. An additional advantage is that the valve device requires little extra construction effort or expense. Overall, the hybrid drive device of the invention has a simple and economical construction of the hydrostatic displacement machine. Because the single consumer of the hydrostatic displacement machine is formed by the high pressure device, the hybrid drive device of the invention has a simple switching technology and compact construction, as well as a simple construction for the valve device for the control of the operation of the hydrostatic displacement device as a pump and as a motor, so that the hybrid drive device of the invention has a simple, compact, and economical construction.

In one advantageous embodiment of the invention, the valve device is a two-position, four-port valve, to which the branch line and the discharge line are connected. The two-position, four-port valve has a shutoff position, in which the branch line and the discharge line are shut off, and an open position in which the branch line and the discharge line are open. A two-position, four-port valve of this type has a simple construction and makes it possible to control the operation of the hydrostatic displacement machine as a pump and as a motor in a simple manner.

The effort and expense required for construction can be further reduced if the two-position, four-port valve is in the form of a switching valve.

In an alternative embodiment of the invention, the valve device has a first control valve that actuates the discharge line and a second control valve that actuates the branch line. The valve device therefore has a distributed construction and comprises two simply constructed control valves that actuate the discharge line and the branch line respectively. A valve device of this type having two separate control valves also requires little extra construction effort and expense.

In one advantageous embodiment of the invention, the first control valve and/or the second control valve is a two-position, two-port valve that has a closed position and an open position. A valve device having two-position, two-port valves has a simple construction and makes it possible in a simple manner to control the operation of the hydrostatic displacement machine as a pump and as a motor.

The effort and expense of construction can be further reduced if the first control valve and/or the second control valve is in the form of a switching valve.

In an alternative and likewise advantageous embodiment of the invention, the first control valve and/or the second control valve is a pressure control valve, the opening pressure difference of which is adjustable, in particular a pressure relief valve. With a pressure control valve such as a pressure relief valve, with an adjustable opening pressure difference located in the discharge line or in the branch line, it is possible with little added construction effort or expense for the valve device, by closing and opening the discharge line or the branch line respectively, to control the operation of the hydrostatic displacement machine as a pump and as a motor.

In one advantageous development of the invention, the valve device can be actuated electrically and is in communication for its actuation with an electronic control device which is in communication on the input side with a sensor device that measures the accumulator pressure of the high pressure accumulator device. This arrangement requires little added construction effort or expense for the control system, because with an electronic control device and a valve device that can be actuated electrically by it as a function of the accumulator pressure of the high pressure accumulator device measured by means of the sensor device, the operation of the hydrostatic displacement machine as a pump can be initiated by an appropriate actuation of the valve device to charge the high pressure accumulator device. When a corresponding accumulator charge pressure is present in the high pressure accumulator device, the operation of the hydrostatic displacement machine as a motor to output a torque can be initiated by a corresponding actuation of the valve device.

Operating strategies are advantageously stored in the electronic control device to charge the high pressure accumulator device with hydraulic fluid as a function of the operating conditions of the vehicle with excess energy from the drive motor and/or, during braking operation of the consumer, with braking energy recovered from the consumer. It thereby becomes possible to charge the high pressure accumulator device under certain operating conditions in which excess energy occurs at the drive motor, and/or during braking operation of the consumer with the braking energy that occurs, to make energy recovery possible. The electronic control device is in communication with corresponding signal generators, by means of which the respective operating condition and/or braking operation of the consumer can be determined, for example, an accelerator pedal device or a brake pedal when the consumer is the traction drive of the vehicle.

In the hybrid drive device of the invention, the hydrostatic displacement machine, when operated as a motor, can function as a booster drive for the running drive motor and/or as a hydraulic starter for the shutoff drive motor. The hybrid drive device of the invention can therefore be used to assist the running drive motor and/or as a hydraulic starter in the framework of a start-stop function of the drive motor. An economical start-stop function of the drive motor can be achieved as a result of the robust construction and operation of the hydrostatic displacement machine.

In one advantageous embodiment of the invention, a pressure relief valve is associated with the high pressure accumulator device. When the hydrostatic displacement machine is operated as a pump by charging the high pressure accumulator device with hydraulic fluid, the charging operation can be protected in a simple manner by means of a pressure relief valve and the accumulator pressure in the high pressure accumulator device can be protected.

In one preferred embodiment of the invention, the high pressure accumulator device can be a pressure accumulator, such as a bladder accumulator, piston accumulator, or membrane accumulator. The high pressure accumulator device is preferably under a precharge, for example, a gas precharge.

In one embodiment of the invention, the low pressure accumulator device can be a tank, in particular, a tank without a precharge, or in an alternative embodiment of the invention, a pressure accumulator, in particular, a precharged tank, bladder accumulator, piston accumulator, or membrane accumulator. The non-precharged tank is preferably in communication with the environment and thus with the atmosphere. A pressure accumulator in the form of a precharged tank as the low pressure accumulator device is preferably under a precharge, for example a gas or pneumatic precharge, wherein the precharge is preferably on a low level in the range of 2 to 10 bar.

With regard to a simple and compact construction of the hybrid drive device of the invention, it is particularly advantageous if the function of the high pressure accumulator device and the low pressure accumulator device is performed by a double piston accumulator. A first pressure chamber of the double piston accumulator is in communication with the delivery line and the discharge line, and a second pressure chamber of the double piston accumulator is in communication with the branch line and the intake line. A double piston accumulator makes it possible to achieve the function of the high pressure accumulator device and the tank-side low pressure accumulator device while occupying a particularly small amount of space.

The hydrostatic displacement machine can be a constant drive unit with a fixed displacement volume.

Alternatively, the hydrostatic displacement machine can be a variable power unit with a unilaterally variable displacement volume. Because the direction of flow of the hydraulic fluid in the hydrostatic displacement machine remains the same in pump operation and in motor operation, there are special advantages to the construction of a hydrostatic displacement machine as a variable power unit in terms of the simple and economical construction of the hydrostatic displacement machine, because the hydrostatic displacement machine can be constructed as a unilaterally variable power unit, in which a displacement volume control device of the variable power unit can be adjusted in a single control direction starting from a position with a minimum displacement volume, for example a position with the displacement volume of zero. A unilaterally variable power unit has a significantly simpler construction of the adjustment of the displacement volume control device than does a bilaterally variable power unit, which results in a more economical and compact construction of the hydrostatic displacement machine.

The displacement volume control device of the variable power unit is advantageously in communication with the electronic control device for its actuation. The electronic control device, by a corresponding setting of the displacement volume control device and, thus, the displacement volume of the variable power unit can control the torque of the hydrostatic displacement machine which is absorbed in combination with the accumulator pressure present in the high pressure accumulator device when the hydrostatic displacement machine is operated as a pump or which is outputed when the hydrostatic displacement machine is operated as a motor.

It is particularly advantageous if a retarder valve is located in the delivery line. With a retarder valve located in the delivery, line that leads to the high pressure accumulator device, and located upstream of the high pressure accumulator device, it is possible in a simple manner on the delivery side of the hydrostatic displacement machine, in the event of insufficient accumulator charging pressure of the high pressure accumulator device, to increase the pressure and to set a pressure on the delivery side of the hydrostatic displacement machine corresponding to the desired braking power.

The invention further relates to a vehicle with a drive train driven by a drive motor and a hydrostatic drive device of the invention, wherein the drive train is in the form of a parallel hybrid. With the hydrostatic hybrid drive train of the invention, it is possible to create a parallel hybrid in a vehicle in a simple and economical manner as well as one in which the hybrid drive device occupies very little space and in which the hydrostatic displacement machine and the drive motor act on the drive train.

The consumer can be a slewing gear driven by a transmission. With a hybrid drive device of the invention, on a vehicle with a slewing gear, for example a machine in the form of an excavator, energy can be recovered during braking operation of the stewing gear and a boost can be provided to the drive motor during the acceleration of the slewing gear.

The consumer can be a drive axle with at least two driven wheels driven by a transmission. With a hybrid drive device of the invention, on a vehicle with a traction drive comprising a drive machine, such as a motor vehicle or a bus, energy can be recovered during braking operation of the vehicle and the drive motor can be boosted during acceleration of the vehicle.

Due to the compact dimensions and compact construction of the hybrid drive device of the invention, the hybrid drive device in the drive train can be located in the direct through-drive. The hydrostatic displacement machine of the hybrid drive device is therefore integrated directly into the drive train and makes a through-drive possible.

Alternatively, the hybrid drive device can be connected with the drive train by means of a displacement transmission, in particular a spur gear transmission. The hydrostatic displacement machine of the hybrid drive device is therefore connected to and integrated into the drive train by means of a displacement transmission.

In one development of the invention, a connection of this type of the hybrid drive device with the drive train of the vehicle by means of a displacement transmission makes it possible to connect the hybrid drive device with the drive train and to isolate it from the drive train by means of a clutch device. The hydrostatic displacement machine of the hybrid drive device can be temporarily isolated from the drive train in the open position of the clutch device. Thus, under certain operating conditions, for example during long steady-state travel of the vehicle, an energy-wasting operation of the hydrostatic displacement machine can be prevented.

On account of the compact dimensions and compact construction of the hybrid drive device, the hybrid drive device can be installed at any desired point of the drive train.

In one embodiment of the invention, the hybrid drive device is located in the drive train between the drive motor and a transmission that drives the consumer.

It is particularly advantageous if a clutch device is located in the drive train in the flow of force between the hybrid drive device and the transmission. When the clutch device is opened, the hybrid drive device of the invention can, in a simple manner, start the shutoff drive motor in the framework of a start-stop function.

It is particularly advantageous if a clutch device is located in the flow of force between the drive motor and the hybrid drive device. If this clutch device is opened and a clutch device that is located in the flow of force between the hybrid drive device and the transmission is closed, the consumer can be driven by means of the hybrid drive device when the drive machine is shut off.

In one alternative embodiment of the invention, the hybrid drive device is located in the drive train between the transmission and the consumer.

It is particularly advantageous if a clutch device is located in the flow of force between the transmission and the hybrid drive device. When the clutch device is open and the drive machine is shut off, the consumer can be driven by means of the hybrid drive device.

In one alternative embodiment of the invention, the hybrid drive device is in a driving connection with an auxiliary axle of the vehicle. If the vehicle, in addition to the drive axle which is driven by means of the transmission, has an auxiliary axle which is connected with the hybrid drive device, energy can be recovered during braking operation of the vehicle, and when the vehicle is traveling, additional torque can be applied by the hybrid drive device by means of the auxiliary axle.

It is particularly advantageous if a clutch device is located in the flow of force between the hybrid drive device and the auxiliary axle. With a clutch device of this type, the hydrostatic displacement machine of the hybrid drive device can be isolated from the auxiliary axle in a simple manner. With the clutch device in the open position, the hydrostatic displacement device of the hybrid drive device can be temporarily isolated from the auxiliary axis. Thus, under certain operating situations, for example during long steady-state travel of the vehicle, a continuous and energy-wasting operation of the hydrostatic displacement machine can be prevented.

Furthermore, in one embodiment of the invention, the hybrid drive device can be in a drive connection with an auxiliary output of the drive motor. As a result of the connection of the hydrostatic displacement machine of the hybrid drive device with an auxiliary output of the drive motor, it is likewise possible by means of the hydrostatic displacement machine to create a booster drive to assist the running drive motor and/or a hydraulic starter to start the shutoff drive motor in the framework of a start-stop function. A clutch device can likewise be provided with which the hydrostatic displacement machine can be isolated from the auxiliary output, to prevent losses caused by the continuous operation of the hydrostatic displacement machine.

BRIEF DESCRIPTION OF THE DRAWINGS

Additional advantages and details of the invention are explained in greater detail below on the basis of the exemplary embodiment illustrated in the accompanying schematic Figs., in which like reference numbers identify like parts throughout.

DESCRIPTION OF THE PREFERRED EMBODIMENT

Figure 1:
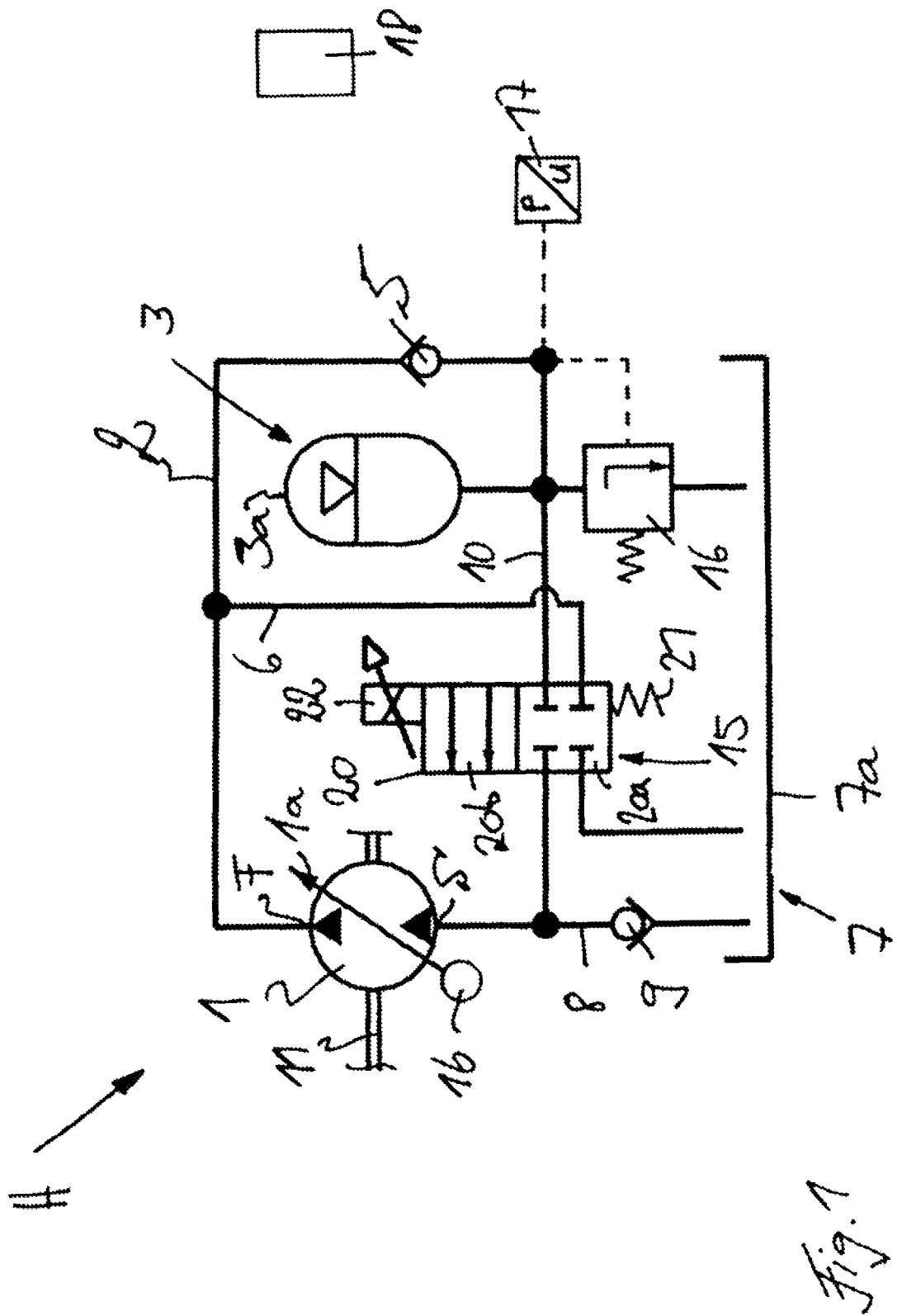
FIG. 1 is a circuit diagram of a first embodiment of a hydrostatic hybrid drive device of the invention.

FIGS. 1 to 5 illustrate different embodiments of a hydrostatic hybrid device H of the invention. In FIGS. 1 to 5, identical components are identified by the same reference numbers.

The hybrid drive device H of the invention includes a single hydrostatic displacement machine 1 which is operated in an open circuit, and can be operated as a pump and as a motor in the same direction of rotation and the same direction of flow of hydraulic fluid. On the hybrid drive device H, the hydrostatic displacement machine is a simply constructed two-quadrant drive unit which can be operated as a pump and as a motor in the same direction of rotation and the same direction of flow of the hydraulic fluid.

The hydrostatic displacement machine 1 has an outlet-side delivery side F to which a delivery line 2 is connected which leads to a high pressure accumulator device 3. The high pressure accumulator device 3 forms the single consumer of the hydrostatic displacement machine 1 so that the hydrostatic displacement machine 1, when it is operated as a pump, delivers hydraulic fluid exclusively into the high pressure accumulator device 3. In the delivery line 2 there is a shutoff valve 5 that opens toward the high pressure accumulator device 3. In the illustrated exemplary embodiment, the shutoff valve 5 is a check valve. There are no valves other than the shutoff valve 5 in the delivery line 2 that leads from the delivery side F of the hydrostatic displacement machine 1 to the high pressure accumulator device 3.

Between the delivery side F of the hydrostatic displacement machine 1 and the shutoff valve 5, and therefore upstream of the shutoff valve 5, a branch line 6 branches off from the delivery line 2 and is connected with a low pressure accumulator device 7.

Connected to an inlet-side intake side S of the hydrostatic displacement machine 1 is an intake line 8 that is in communication with the low pressure accumulator device 7. A shutoff valve 9 is located in the intake line 8 that shuts off the flow to the low pressure accumulator device 7. In the illustrated embodiment, the shutoff valve 9 is in the form of a check valve.

Connected to the intake line 8 between the intake side S of the hydrostatic displacement machine 1 and the shutoff valve 9, and therefore downstream of the shutoff valve 9, is a discharge line 10 which is connected with the high pressure accumulator device 3.

The hydrostatic displacement machine 1 has a drive shaft 11, by means of which, when the hydrostatic displacement machine is being operated as a pump, a torque from a drive train can be applied to drive the hydrostatic displacement machine 1. When the hydrostatic displacement machine 1 is being operated as a motor, a torque can be introduced into a drive train by the hydrostatic displacement machine 1.

The hybrid drive device H of the invention also comprises a valve device 15 that actuates the discharge line 10 and the branch line 6.

When the hydrostatic displacement machine 1 is operated as a pump, the discharge line 10 and the branch line 6 are shut off by means of the valve device 15 so that the hydrostatic displacement machine 1, takes in hydraulic fluid with the intake side S via the intake line 8 and the opening shutoff valve 9 and delivers it on the delivery side F via the delivery line 2 and the opening shutoff valve 5 into the high pressure accumulator device 3 and charges the high pressure accumulator device 3 with hydraulic fluid.

When the hydrostatic displacement machine 1 is operated as a motor, the discharge line 10 and the branch line 6 are actuated to open by means of the valve device 15. When the hydrostatic displacement machine 1 is operated as a motor, it is operated by hydraulic fluid under pressure fed via the intake side S (which is connected by means of the opened discharge line 10 with the high pressure accumulator device 3). In operation as a motor, the delivery side F of the hydrostatic displacement machine 1 is connected via the opened branch line 6 with the low pressure accumulator device 7, so that a return flow of the hydraulic fluid driving the hydrostatic displacement machine 1 via the delivery line 2 and the opened branch line 6 to the low pressure accumulator device 7 is achieved. When the hydrostatic displacement machine 1 is operated as a motor, the shutoff valve 5 in the delivery line that shuts off the flow to the delivery side F protects the return flow of the hydraulic fluid from the high pressure accumulator device 3 to the delivery side F of the hydrostatic displacement machine 1. When the hydrostatic displacement machine 1 is operated as a motor, the shutoff valve 9 in the intake line 8 that shuts off the flow to the low pressure accumulator device 7 prevents the discharge of the hydraulic fluid from the high pressure accumulator device 3 into the low pressure accumulator device 7 when the discharge line 10 is opened.

Also associated with the high pressure accumulator device 3 is a pressure relief valve 16 that protects the accumulator charge pressure.

In FIGS. 1, 2, 4, and 5 the high pressure accumulator device 3 is a high pressure accumulator 3*a*, such as a bladder accumulator, piston accumulator, or membrane accumulator. The pressure accumulator 3*a* is under a precharge, such as a gas precharge.

Figure 4:
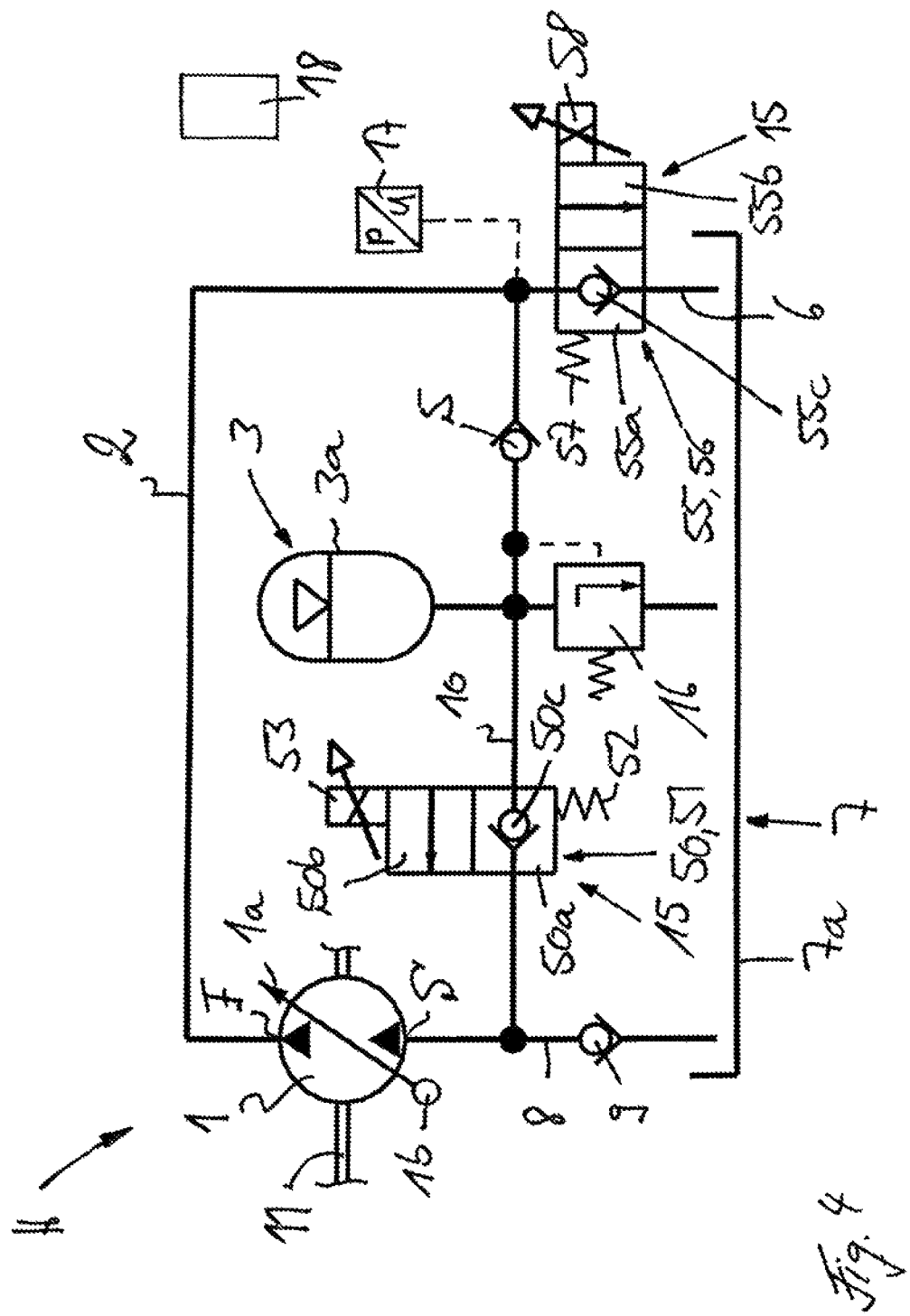
FIG. 4 shows the embodiment illustrated in FIG. 1 with an alternative embodiment of a valve device of the hybrid drive device.
Figure 5:
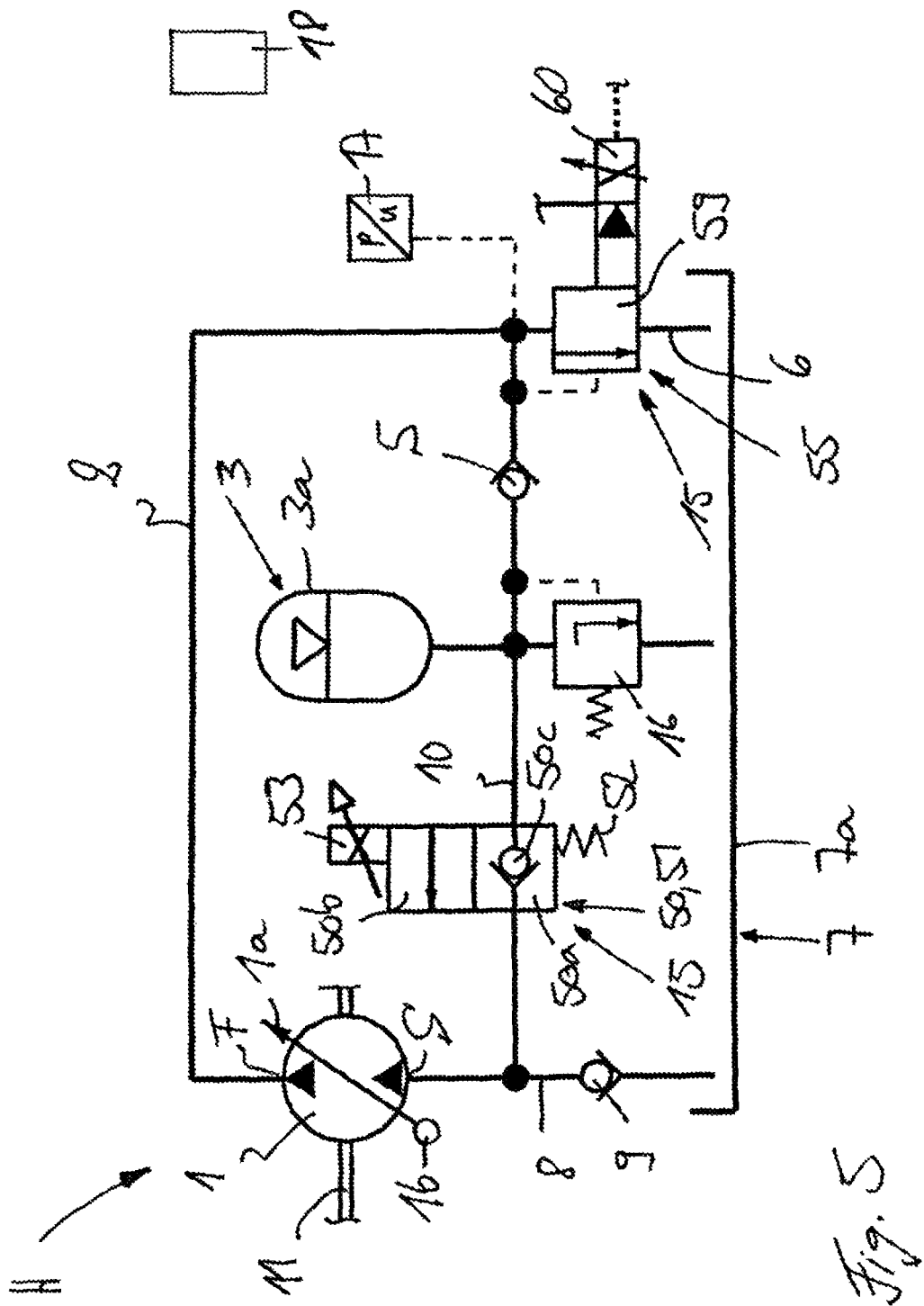
FIG. 5 shows the embodiment illustrated in FIG. 1 with an alternative embodiment of a valve device of the hybrid drive device.

The low pressure accumulator 7 illustrated in FIGS. 1, 4, and 5 is a tank 7*a*. The tank 7*a* in FIGS. 1, 4, and 5 is a non-precharged tank which is in communication with the environment and, thus, with the atmosphere.

For the measurement of the accumulator charge pressure present in the high pressure accumulator device 3, a sensor device 17 is provided which is in communication with an electronic control device 18.

The valve device 15 can be actuated electrically and for its actuation is in communication with the electronic control device 18.

In FIGS. 1 to 5, the hydrostatic displacement machine 1 is a variable power unit with a variable displacement volume. The hydrostatic displacement machine 1 is unilaterally variable, whereby a displacement volume control device 1*a* of the hydrostatic displacement machine 1 for example, is a swashplate with a variable inclination when the hydrostatic displacement machine 1 is an axial piston machine utilizing a swashplate construction, can be adjusted starting from a position with a minimum displacement volume, preferably a position with a displacement volume of zero, into a control position in the direction of a maximum displacement volume.

The displacement volume of the hydrostatic displacement machine 1 can be controlled electrically or electro-hydraulically, in particular electro-proportionally. For this purpose, the displacement volume control device 1*a* of the hydrostatic displacement machine 1 can be actuated electrically by means of an electrical actuator device 1*b*, which is in communication for its actuation with the electronic control device 18. Alternatively, the displacement volume of the hydrostatic displacement machine 1 can be controlled hydraulically.

Figure 2:
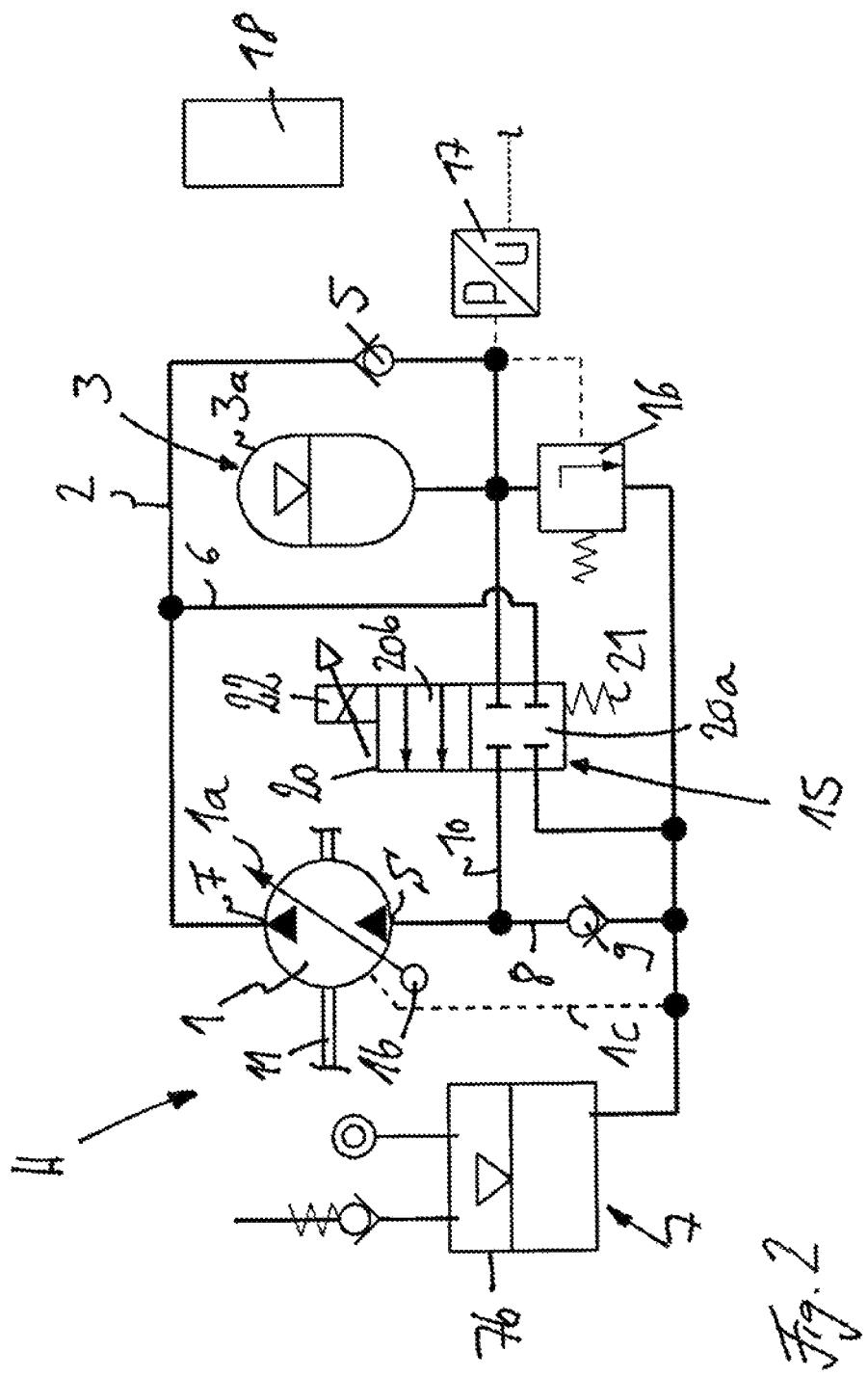
FIG. 2 is a circuit diagram of a second embodiment of a hydrostatic hybrid drive device of the invention.
Figure 3:
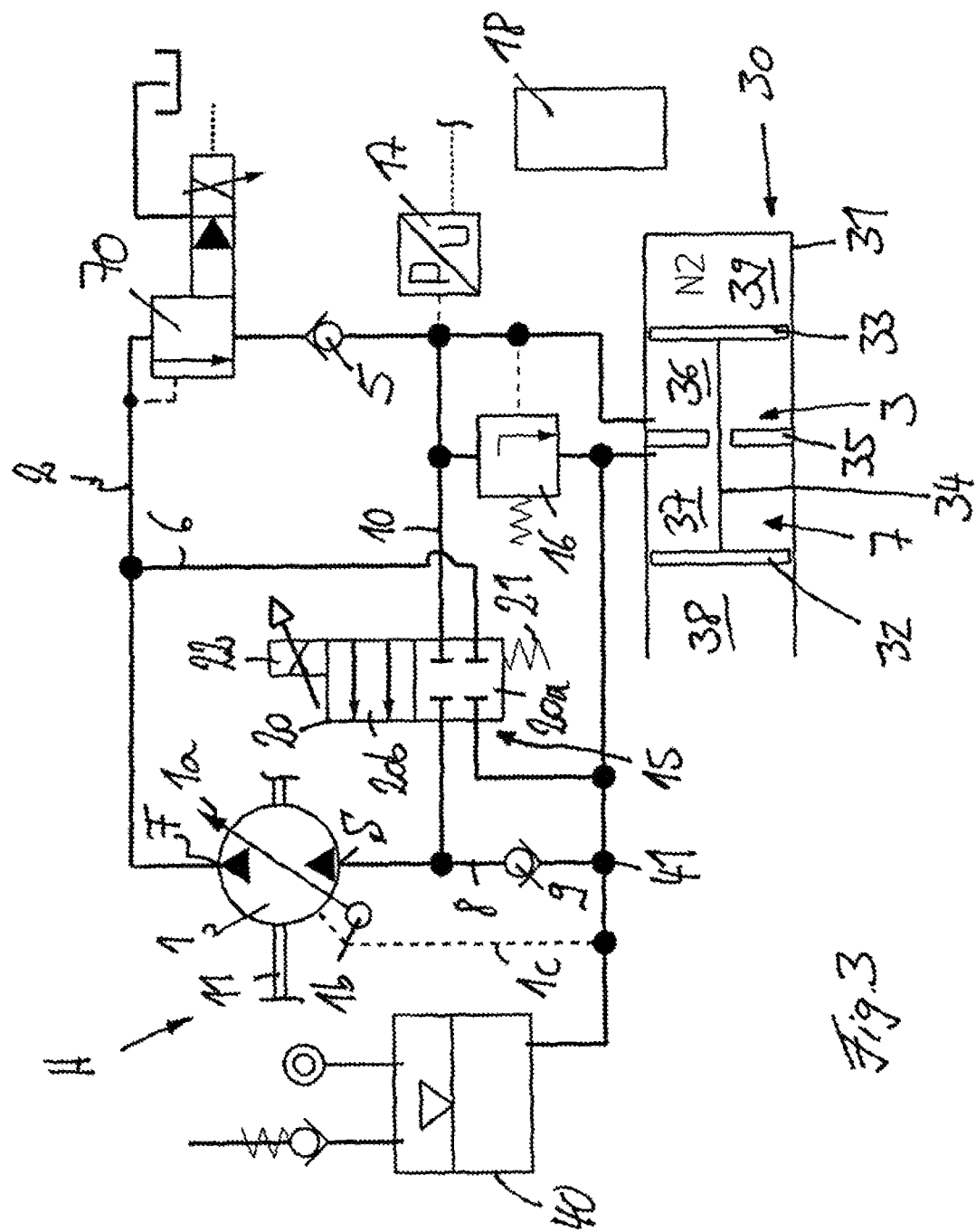
FIG. 3 is a circuit diagram of a third embodiment of a hydrostatic hybrid drive device of the invention.

In FIGS. 1 to 3, the electrically actuatable valve device 15 is a two-position, four-port valve 20, to which the branch line 6 and the discharge line 10 are connected. The two-position four-port valve 20 located in the branch line 6 and the discharge line 10 has a closed position 20*a* in which the branch line 6 and the discharge line 10 are closed, and an open position 20*b* in which the branch line 6 and the discharge line 10 are opened.

In the exemplary embodiment illustrated in FIGS. 1 to 3, the two-position four-port valve 20 is a switching valve.

In the illustrated exemplary embodiments, the two-position, four-port valve 20 is actuated by means of a spring device 21 into the closed position 20*a* and can be actuated into the open position 20*b* by means of an electrical actuator device 22, such as an actuating magnet, which is in communication for its actuation with the electronic control device 18.

FIG. 2 shows an embodiment of the invention in which the low pressure accumulator device 7 is in the form of a pressure accumulator 7*b*. In the illustrated exemplary embodiments, the pressure accumulator 7*b* is a precharged tank, for example a pneumatically precharged tank. Alternatively, the pressure accumulator 7*b* can be a bladder accumulator, piston accumulator, or membrane accumulator. The precharge of the pressure accumulator 7*b* is preferably set to a low-pressure level in the range of 2 to 10 bar which is less than the precharge of the pressure accumulator 3*a*. The intake line 8 and the branch line 6 are connected to the pressure accumulator 7*b*.

FIG. 2 also shows a leakage line 1*c* of the hydrostatic displacement machine 1 which is connected with the low pressure accumulator device 7. Leakage that occurs during operation of the hydrostatic displacement machine 1 inside the housing of the hydrostatic displacement machine 1 can therefore be diverted into the low pressure accumulator device 7.

FIG. 3 shows an embodiment of the invention in which the function of the high pressure accumulator device 3 and the low pressure accumulator device 7 is performed by a double piston accumulator 30.

The double piston accumulator 30 has a housing 31 in which two pistons 32, 33 are located so that they can move longitudinally. The two pistons 32, 33 are rigidly connected to each other by connecting means 34, such as a piston rod. Between the two pistons 32, 33 the housing 31 is provided with a partition 35 through which connecting means 34 extend. The connecting means 34 are sealed in the partition 35 in a manner not illustrated in detail. The inner end surfaces of the two pistons 32, 33, together with the housing 31 and the partition 35, define respective pressure chambers 36, 37. The pressure chambers 36, 37 surround the connecting means 34 and are therefore in the form of piston-rod-side pressure chambers. The outer end surfaces of the piston 32, together with the housing 31, define a pressure chamber 38 which is vented. The outer end surfaces of the piston 33, together with the housing 31 and the housing cover, define a pressure chamber 39 which is under a precharge. In the illustrated exemplary embodiment, the precharge is a gas precharge, such as nitrogen.

The inner end surfaces and the outer end surfaces of the two pistons 32, 33 each have the same area.

In the illustrated exemplary embodiment, the pressure chamber 36 of the double piston accumulator 30 forms the high pressure accumulator device 3. The pressure chamber 36 of the double piston accumulator 30 is connected with the delivery line 2 and the discharge line 10. The pressure chamber 37 of the double piston accumulator 30 forms the low pressure accumulator device 7. The pressure chamber 37 of the double piston accumulator 30 is connected with the branch line 6 and the intake line 8.

The double piston accumulator 30 can accept or discharge hydraulic fluid to or from the two outboard pressure chambers 38, 39. For example, the pressure chamber 36 is precharged and the high pressure accumulator device 3 is formed by the pressure chamber 39, which is connected with the delivery line 2 and the discharge line 10. The pressure chamber 38 should be closed by means of a housing cover, so that the pressure chamber 38 can be a low pressure accumulator device 7, which is connected with the branch line 6 and the intake line 8. In that case, the pressure chamber 37 must be vented.

To compensate for the leakage of the hydrostatic displacement machine 1, FIG. 3 shows a make-up tank 40 which is connected with the intake line 8. The check valve 9 is located between the connection 41 of the makeup tank 40 to the intake line 8 and the intake side S of the hydrostatic displacement machine 1. In the illustrated exemplary embodiment, the make-up tank 40 is a precharged tank, for example a pneumatically precharged tank. Alternatively, the compensation tank 40 can be in the form of a bladder accumulator, piston accumulator, or membrane accumulator.

In FIG. 3, a retarder valve 70 is located in the delivery line 2 that leads from the delivery side F of the hydrostatic displacement machine 1 to the high pressure accumulator device 3. In the illustrated exemplary embodiment, the retarder valve 70 is a pressure control valve that can be set electrically and is in communication with the electronic control device 18 for its actuation. The retarder valve 70 makes it possible to set the pressure in the inlet to the high pressure accumulator device 3 so that it corresponds to the desired braking power if sufficient charging pressure is not yet available in the high pressure accumulator device 3.

FIGS. 4 and 5 illustrate alternative embodiments of the valve device 15 in a distributed construction.

In FIGS. 4 and 5 the valve device 15 has a first control valve 50 that actuates the discharge line 10 and a second control valve 55 that actuates the branch line 6.

The first control valve 50 is a two-position, two-port valve 51 which is located in the discharge line 10 and has a closed position 50*a* and an open position 50*b*. The closed position 50*a* is preferably leak-tight, with a shutoff valve 50*c*, such as a check valve, that can be actuated into the closed position in which it shuts off the flow to the intake line 8. In the illustrated exemplary embodiment, the two-position, two-port valve 51 is actuated by means of the spring device 52 into the closed position 50*a* and can be actuated into the open position 50*b* by means of an electrical actuator device 53, such as an actuating magnet, which is in communication for its actuation with the electronic control device 18.

In the illustrated exemplary embodiment, the two-position, two-port valve 51 is a switching valve.

In FIG. 4, the second control valve 55 is also in the form of a two-position, two-port valve 56 which is located in the branch line 6 and has a closed position 55*a* and an open position 55*b*. The closed position 55*a* is preferably leak-tight, with a shutoff valve 55*c*, such as a check valve, that can be actuated into the closed position in which it shuts off the flow to the low pressure accumulator device 7. In the illustrated exemplary embodiment, the two-position, two-port valve 56 is actuated into the closed position 55*a* by means of the spring device and can be actuated into the open position 55b by means of an electrical actuator device 58, such as a magnetic actuator, which is in communication for its actuation with the electronic control device 18.

In the illustrated exemplary embodiment, the two-position, two-port valve 56 is a switching valve.

In FIG. 5, the second control valve 55 is a pressure control valve 59, in particular a pressure relief valve, the opening pressure difference of which can be controlled. To vary and set the opening pressure difference, the pressure control valve 59 is provided with an electrical actuator device 60, such as an actuator magnet or proportional magnet, which is in communication for its actuation with the electronic control device 18.

Alternatively, the first control valve 50 can be in the form of a pressure control valve with an opening pressure difference that can be controlled, and the second control valve 55 can be a two-position, two-port valve 56. It is also possible for the first control valve 50 and the second control valve 55 each to be pressure control valves 59 with a controllable opening pressure difference.

The embodiments of the valve device 15 in FIGS. 4 and 5 can also be employed in the embodiments illustrated in FIGS. 2 and 3.

The use of a retarder valve 70 limited to the embodiment illustrated in FIG. 3. It can also be used in the embodiments illustrated in FIG. 1, 2, 4, or 5.

The hydrostatic displacement machine 1 of the hybrid drive device H illustrated in FIGS. 1 to 5 is or can be put into a drive connection by means of the drive shaft 11 with a drive train which is not illustrated in detail to form a hybrid drive train in the form of a parallel hybrid.

By driving the hydrostatic displacement machine 1 by means of the drive shaft 11, the hydrostatic displacement machine functions as a pump. For operation as a pump, the branch line 6 and the discharge line 10 are shut off by means of the valve device 15. The valve device 15 illustrated in FIGS. 1 to 3 is actuated into the closed position 20a. The control valves 50, 55 of the valve device 15 illustrated in FIG. 4 are actuated into the closed positions 50a, 55a, or in FIG. 5 the control valve 50 of the valve device 15 is actuated into the closed position 50a and the control valve 55 which is in the form of a pressure control valve 59 is set to a maximum opening pressure difference.

In operation as a pump, the hydrostatic displacement machine 1 driven by means of the drive shaft 11 takes in hydraulic fluid via the intake line 8 and the opening shutoff valve 9 from the low pressure accumulator device 7 and delivers the hydraulic fluid via the delivery line 2 and the opening shutoff valve 5 into the high pressure accumulator device 3. The shutoff valve 5 in the delivery line 2, which shuts off the flow to the hydrostatic displacement machine 1, prevents the return of hydraulic fluid from the high pressure accumulator device 3 to the delivery side F of the hydrostatic displacement machine 1.

In operating conditions in which a drive motor of the drive train supplies excess energy, the high pressure accumulator device 3 can be charged and pressurized with the excess energy that occurs under certain operating conditions on the primary side at the drive motor of the drive train. Alternatively, the high pressure accumulator device 3 can be charged by operating the hydrostatic displacement machine as a pump during braking of the consumer of the drive train, so that the high pressure accumulator device 3 is charged by the braking energy and energy recovery takes place. Therefore, when the consumer is in the form of a traction drive of the vehicle, during braking operation, i.e., during deceleration of the vehicle, the high pressure accumulator device 3 is charged with hydraulic fluid under pressure. Corresponding operating strategies for the charging of the high pressure accumulator device 3 are stored in the electronic control device 18. The operating conditions can be detected on the basis of corresponding input variables in which the drive motor delivers excess energy or there is a braking operation of the consumer. The accumulator charge status of the high pressure accumulator device 3 is monitored by means of the sensor device 17. When the hydrostatic displacement machine 1 is a variable drive unit with a variable displacement volume, the torque to be absorbed can be controlled by means of an appropriate setting of the displacement volume as desired by the electronic control device 18.

If the high-pressure storage device 3 is fully charged and this status is detected by the electronic control device 18, the energy stored in the high pressure accumulator device 3 can be output to the drive train by operating the hydrostatic displacement machine 1 as a motor, by delivering hydraulic fluid from the high pressure accumulator device 3 to the hydrostatic displacement machine 1 on the intake side S. During operation as a motor, the hydrostatic displacement machine 1 is driven by the hydraulic fluid from the high pressure accumulator device 3, and outputs a torque to the drive train by means of the drive shaft 11.

For operation as a motor, the branch line 6 and the discharge line 10 are opened by means of the valve device 15 and actuated to allow a through-flow. For this purpose, the valve device 15 illustrated in FIGS. 1 to 3 is actuated into the open position 20b. The control valves 50, 55 of the valve device 15 illustrated in FIG. 4 are actuated into the open positions 50b, 55b, or in FIG. 5 the control valve 50 of the valve device 15 is actuated into the open position 50b, and the control valve 55, which is in the form of a pressure control valve 51, and is set to a minimum operating pressure difference.

When the hydrostatic displacement machine 1 is operated as a motor, hydraulic fluid under pressure from the high pressure accumulator device 3 is delivered to the intake side S by means of the open discharge line 10, so that the hydrostatic displacement machine 1 outputs and feeds a torque to the drive shaft 11 that is the result of the accumulator charging pressure and the set displacement volume and feeds it into the drive train. The shutoff valve 9 in the intake line 8 prevents an outflow of the hydraulic fluid from the high pressure accumulator device 3 into the low pressure accumulator device 7. The delivery line 2 of the hydrostatic displacement machine 1 is connected by means of the open branch line 6 with the low pressure accumulator device 7 so that a return flow of the hydraulic fluid driving the hydrostatic displacement machine 1 from the high pressure accumulator device 3 into the low pressure accumulator device 7 becomes possible.

When the hydrostatic displacement machine 1 is a variable drive unit with a variable displacement volume, the torque output can be set to any desired value on the electronic control device 18 by a corresponding setting of the displacement volume.

By operating the hydrostatic displacement machine 1 as a motor, when the drive motor is running, a torque that assists the drive motor can be output to the drive train to make a boost function possible. Alternatively, by operating the hydrostatic displacement machine 1 as a motor, a hydraulic starter for a start-stop function of the drive motor of the drive train can be provided which can start the shutoff drive motor in a short period of time.

The hybrid drive device H of the invention, in which the high pressure accumulator device 3 forms the only consumer of the hydrostatic displacement machine, makes possible a compact, simple, and economical construction, because the intake line 8, the delivery line 2, the branch line 6, and the discharge line 10 in FIGS. 1 to 5 can be in the form of channels in a housing in which the valve device 15 is located and to which the high pressure accumulator device 3 and the low pressure accumulator device 7 are connected. The housing can be attached directly to a flanged surface of a housing of the hydrostatic displacement machine 1, which is provided with connections that form the intake side S in the delivery side F of the hydrostatic displacement machine 1.

The invention also makes available a robust and functionally reliable hydrostatic hybrid drive device H, which in turn results in particular advantages in the framework of a start-stop function of the drive motor of the drive train, in which a robust and functionally reliable design of the starter of the drive motor is necessary on account of a high number of starting processes.

The design of the hydrostatic displacement machine 1 as a displacement machine operated in an open circuit that can function both as a pump and as a motor in the same direction of rotation of the drive shaft 11 and the same direction of flow of the hydraulic fluid results in a simple and economical construction of the hydrostatic displacement machine 1. When the hydrostatic displacement machine 1 is in the form of a variable drive unit with a variable displacement volume, there are particular advantages with regard to a simple, compact, and economical construction, because only a unilaterally variable drive unit is necessary, the control of the displacement volume control device of which is simply and compactly constructed, which results in an economical and compact construction of the hydrostatic displacement machine in the form of a variable drive unit.

The hydrostatic hybrid drive unit H of the invention illustrated in FIGS. 1 to 5, on account of the compact and simple construction, makes it possible to install the hybrid drive device in any desired location in a drive train of the vehicle, as illustrated in FIGS. 6a to 6e. In FIGS. 6a to 6e, the hydrostatic hybrid drive device H is shown in a simplified manner, whereby only the hydrostatic displacement machine 1 and the high pressure accumulator device 3 are shown.

In FIGS. 6a to 6e, the drive train A of the vehicle is shown which comprises a drive motor AM, such as an internal combustion engine, and a consumer V which is driven by the drive motor AM. In FIGS. 6a to 6e, as a result of the integration of the hydrostatic hybrid drive device H of the invention, a parallel hybrid is formed in which the hybrid drive device H acts in addition to the drive motor AM as the energy source on the drive train A. An electric motor or a turbine can alternatively be provided as the drive motor AM.

In FIGS. 6a to 6e, the consumer V of the vehicle is in the form of a traction drive that comprises a drive axle AA which is driven by a transmission G with at least two driven drive wheels A1, A2. The drive axle AA is in the form of a differential axle, whereby a driveshaft AW of the drive train A drives a differential D of the drive axle AA and the differential D is connected by means of drive shafts TW1, TW2 with the driven wheels A1, A2.

The transmission G illustrated in FIGS. 6a to 6e can be a continuous hydrostatic transmission, a mechanical multi-speed transmission, a powershift transmission, or a hydrodynamic converter.

Figure 6A:
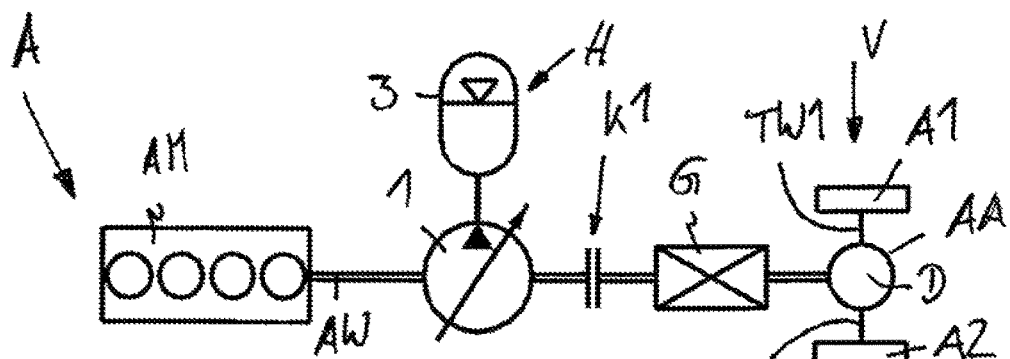
FIGS. 6*a* to 6*e* show different embodiments of a vehicle with a drive train that comprises a hybrid drive device of the invention.
Figure 6B:
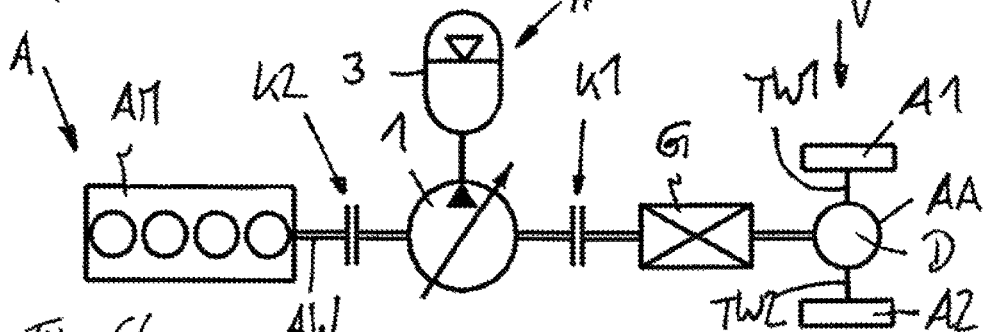
Figure 6C:
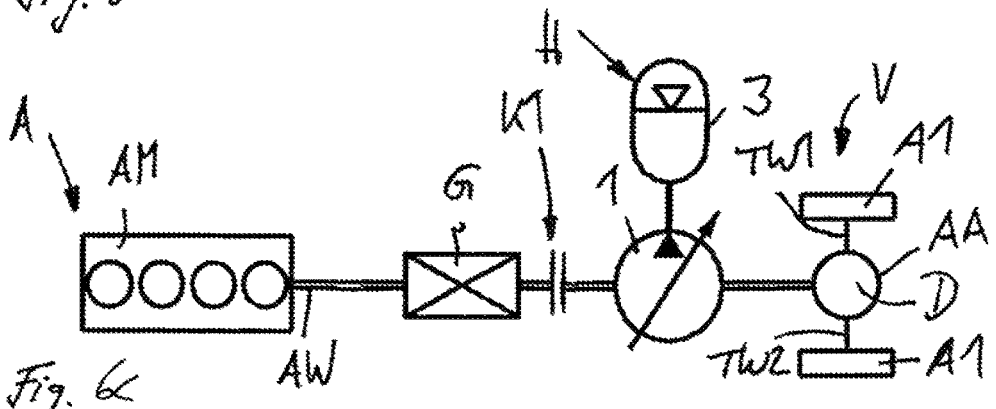

In FIGS. 6a to 6c, the hybrid drive device H in the drive train A is located in a direct through-drive. A straight power transfer therefore occurs in the hydrostatic displacement machine 1, so that the drive shaft 11 of the hydrostatic displacement machine 1 forms a component of the driveshaft AW of the drive train A.

In FIG. 6a, the hybrid drive device H is located in the drive train A between the drive motor AM and the transmission G. The driveshaft AW of the drive train A is provided with a clutch device K1 between the hybrid drive device H and the transmission G.

FIG. 6b shows the development of FIG. 6a, whereby an additional clutch device K2 is located on the driveshaft AW of the drive train A between the drive motor AM and the hybrid drive device H.

In FIG. 6c, the hybrid drive device H is located in the drive train A between the transmission G and the consumer V. The driveshaft AW of the drive train A is provided with a clutch device K1 between the transmission G and the hybrid drive device H.

Figure 6D:
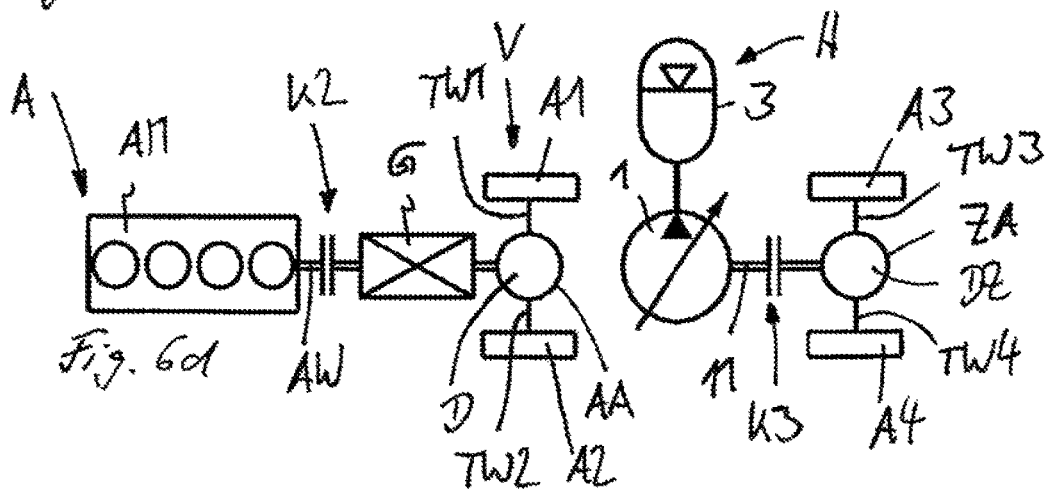

FIG. 6d illustrates one exemplary embodiment in which the vehicle, in addition to the drive axle AA which is driven by the drive motor AM via the drive train A, has an auxiliary axle ZA, whereby the hybrid drive device H is in a drive connection with the auxiliary axle ZA of the vehicle. The auxiliary axle ZA is a differential axle, whereby the hydrostatic displacement machine 1 of the hybrid drive device H, by means of the drive shaft 11, drives a differential DZ of the auxiliary axle ZA and the differential DZ is connected by means of drive shafts TW3, TW4 with the wheels A3, A4 of the auxiliary axle ZA. A clutch device K3 is located in the flow of force between the hydrostatic displacement machine 1 of the hybrid drive device H and the auxiliary axle ZA.

Figure 6E:
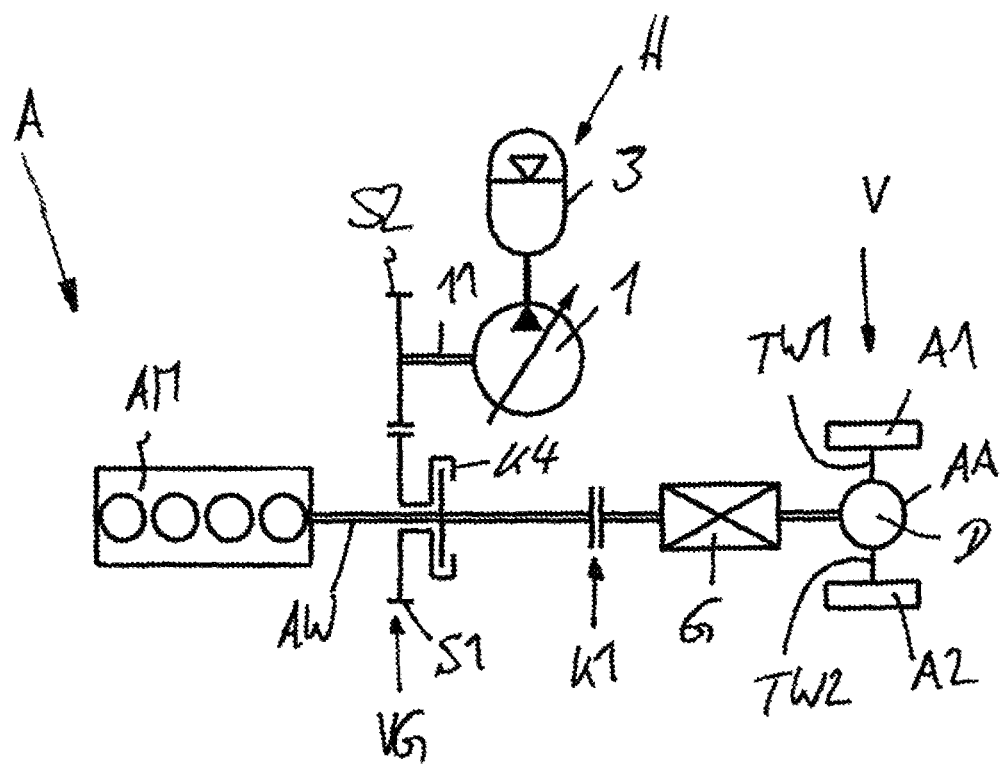

FIG. 6e illustrates one exemplary embodiment in which the hybrid drive device H is connected with the drive train A by means of a displacement transmission VG. In the illustrated exemplary embodiment, the displacement transmission VG is a spur gear transmission which comprises a spur gear S1 that is in communication with the driveshaft AW and a spur gear S2 that meshes with the spur gear S1 and is connected with the drive shaft 11 of the hydrostatic displacement machine 1. The displacement transmission VG makes it possible to locate the hydrostatic displacement machine 1 with the drive shaft 11 parallel to and at some distance from the driveshaft AW of the drive train A. FIG. 6e also shows a clutch device K4, by means of which the hybrid drive device H can be connected with the drive train A or isolated from the drive train A. In the illustrated exemplary embodiment, the clutch device K4 is located between the driveshaft AW of the drive train A and the spur gear S1 of the displacement transmission VG.

In FIG. 6e, the hybrid drive device H is integrated in the drive train A between the drive motor AM and the clutch device K1, and thus, the hybrid drive device H is located in the drive train A between the drive motor AM and the transmission G driving the consumer V as illustrated in FIG. 6a. The hybrid drive device H in the variants of FIGS. 6b to 6d can be connected analogously to the drive train A by means of the displacement transmission VG.

As illustrated in FIGS. 6a to 6e, on account of its compact and simple construction, the hydrostatic hybrid drive device H of the invention can be installed in a simple manner as an additional energy source at any desired location in a drive train to form a parallel hybrid. The hydrostatic hybrid drive device H of the invention can therefore be easily adapted to different drive trains and different vehicles. The hydrostatic hybrid drive device H of the invention can be combined with different transmissions G.

It will be readily appreciated by those skilled in the art that modifications may be made to the invention without departing from the concepts disclosed in the foregoing description. Accordingly, the particular embodiments described in detail are illustrative only and are not limiting to the scope of the invention, which is to be given the full breadth of the appended claims and any and all equivalents thereof.

The invention claimed is:

1. A hydrostatic hybrid drive device for a hybrid drive train of a vehicle, comprising:
a drive motor;
a consumer driven by the drive motor; and
a hybrid drive device comprising only one hydrostatic displacement machine operated in an open circuit and operable as a pump and a motor in the same direction of rotation and the same direction of flow of a hydraulic fluid;
a delivery line connected to an outlet-side delivery side of the hydrostatic displacement machine and connected to a high pressure accumulator device, wherein the hydrostatic displacement machine, when operated as a pump, delivers exclusively into the high pressure accumulator device defining the only consumer supplied by the hydrostatic displacement machine;
a first shutoff valve located in the delivery line and operable to permit flow to the high pressure accumulator device;
a branch line branching off from the delivery line between the delivery side of the hydrostatic displacement machine and the first shutoff valve and connected with a low pressure accumulator device;
an intake line connected to an inlet-side intake side of the hydrostatic displacement machine and connected with the low pressure accumulator device;
a second shutoff valve located in the intake line and configured to shutoff the flow to the low pressure accumulator device;
a discharge line from the high pressure accumulator device to the intake line and connected between the intake side of the displacement machine and the second shutoff valve; and
a valve device configured to actuate the discharge line and the branch line, wherein, when the hydrostatic displacement machine is operated as a pump, the valve device shuts off the discharge line and the branch line and, when the hydrostatic displacement machine is operated as a motor, actuates the discharge line and the branch line to allow a through flow.

2. The hydrostatic hybrid drive device as recited in claim 1, wherein the valve device comprises a two-position, four-port valve to which the branch line and the discharge line are connected, wherein the two-position, four-port valve has a closed position in which the branch line and the discharge line are closed and an open position in which the branch line and the discharge line are opened.

3. The hydrostatic hybrid drive device as recited in claim 2, wherein the two-position, four-port valve is a switching valve.

4. The hydrostatic hybrid drive device as recited in claim 1, wherein the valve device includes a first control valve that actuates the discharge line, and a second control valve that actuates the branch line.

5. The hydrostatic hybrid drive device as recited in claim 4, wherein the first control valve and/or the second control valve comprises a two-position, two-port valve, that has a closed position and an open position.

6. The hydrostatic hybrid drive device as recited in claim 4, wherein the first control valve and/or the second control valve comprises a switching valve.

7. The hydrostatic hybrid drive device as recited in claim 4, wherein the first control valve and/or the second control valve comprises a pressure control valve, with an adjustable opening pressure.

8. The hydrostatic hybrid drive device as recited in claim 1, wherein the valve device is electrically actuatable and is in communication for its actuation with an electronic control device, which is in communication on an input side with a sensor device that measures the accumulator pressure of the high pressure accumulator device.

9. The hydrostatic hybrid drive device as recited in claim 8, wherein operating strategies are stored in the electronic control device to charge the high pressure accumulator device as a function of operating conditions of the vehicle with excess energy from the drive motor and/or during braking operation of the consumer by operating the hydrostatic displacement machine as a pump.

10. The hydrostatic hybrid drive device as recited in claim 1, wherein the hydrostatic displacement machine, when operated as a motor, is a booster drive for the running drive motor and/or is a hydraulic starter for the shutoff drive motor.

11. The hydrostatic hybrid drive device as recited in claim 1, including a pressure relief valve operatively associated with the high pressure accumulator device.

12. The hydrostatic hybrid drive device as recited in claim 1, wherein the high pressure accumulator device comprising a pressure accumulator selected from the group consisting of a bladder accumulator, a piston accumulator, and a membrane accumulator.

13. The hydrostatic hybrid drive device as recited in claim 1, wherein the low pressure accumulator device comprises a tank or a pressure accumulator selected from the group consisting of a precharged tank, a bladder accumulator, a piston accumulator, and a membrane accumulator.

14. The hydrostatic hybrid drive device as recited in claim 1, wherein the high pressure accumulator device and the low pressure accumulator device comprise a double piston accumulator, wherein a first pressure chamber of the double piston accumulator is connected with the delivery line and the discharge line, and a second pressure chamber of the double piston accumulator is connected with the branch line and the intake line.

15. The hydrostatic hybrid drive device as recited in claim 1, wherein the hydrostatic displacement machine comprises a constant power unit with a fixed displacement volume.

16. The hydrostatic hybrid drive device as recited in claim 1, wherein the hydrostatic displacement machine comprises a variable power unit with a unilaterally variable displacement volume, and a displacement volume control device of the variable power unit is variable in one control direction, starting from a position with a minimum displacement volume.

17. The hydrostatic hybrid drive device as recited in claim 16, wherein the displacement volume control device of the variable power unit is in communication for its actuation with the electronic control device.

18. The hydrostatic hybrid drive device as recited in claim 1, including a retarder valve located in the delivery line.

19. The vehicle with a drive train driven by a drive motor and a hydrostatic hybrid drive device as recited in claim 1, wherein the drive train is a parallel hybrid.

20. The vehicle as recited in claim 19, wherein the consumer is a slewing gear driven by a transmission.

21. The vehicle as recited in claim 19, wherein the consumer is a drive axle driven by a transmission with at least two driven drive wheels.

22. The vehicle as recited in claim 19, wherein the hybrid drive device in the drive train is located in the direct through-drive.

23. The vehicle as recited in claim 19, wherein the hybrid drive device is connected with the drive train by a displacement transmission comprising a spur gear transmission.

24. The vehicle as recited in claim 23, wherein the hybrid drive device is connected to the drive train and unconnected from the drive train by means of a clutch device.

25. The vehicle as recited in claim 19, wherein the hybrid drive device is located in the drive train between the drive motor and a transmission driving the consumer.

26. The vehicle as recited in claim 25, including a clutch device located in the drive train, in the flow of force between the hybrid drive device and the transmission.

27. The vehicle as recited in claim 25, including a clutch device is located in the flow of force between the drive motor and the hybrid drive device.

28. The vehicle as recited in claim 19, wherein the hybrid drive device is located in the drive train between the transmission and the consumer.

29. The vehicle as recited in claim 28, including a clutch device located in the drive train in the flow of force between the transmission and the hybrid drive device.

30. The vehicle as recited in claim 19, wherein the hybrid drive device is in a drive connection with an auxiliary axle of the vehicle.

31. The vehicle as recited in claim 30, including a clutch device located in the flow of force between the hybrid drive device and the auxiliary axle.

32. The vehicle as recited in claim 19, wherein the hybrid drive device is in a drive connection with an auxiliary output of the drive motor.

* * * * *